(12) United States Patent
Stempfley (10) Patent No.: US 11,624,397 B2
(45) Date of Patent: Apr. 11, 2023

(54) FASTENING NUT DEVICE

(71) Applicant: Daniel Stempfley, West Chester, OH (US)

(72) Inventor: Daniel Stempfley, West Chester, OH (US)

( * ) Notice: Subject to any disclaimer, the term of this patent is extended or adjusted under 35 U.S.C. 154(b) by 427 days.

(21) Appl. No.: 16/904,069

(22) Filed: Jun. 17, 2020

(65) Prior Publication Data

US 2021/0396265 A1    Dec. 23, 2021

(51) Int. Cl.
*F16B 13/12*    (2006.01)
*F16B 39/02*    (2006.01)
*F16B 25/00*    (2006.01)
*F16B 37/00*    (2006.01)

(52) U.S. Cl.
CPC .......... *F16B 39/023* (2013.01); *F16B 13/124* (2013.01); *F16B 13/128* (2013.01); *F16B 25/0078* (2013.01); *F16B 37/00* (2013.01)

(58) Field of Classification Search
CPC .... F16B 37/00; F16B 25/0078; F16B 13/128; F16B 13/124
USPC ........................... 411/71, 108, 178
See application file for complete search history.

(56) References Cited

U.S. PATENT DOCUMENTS

| | | | |
|---|---|---|---|
| D32,793 S | 6/1900 | Huber | |
| 1,051,444 A | 1/1913 | Pleister | |
| 2,463,859 A | 3/1949 | Engstrom | |
| 2,639,179 A * | 5/1953 | Phelps | E05B 65/0057 411/968 |
| 3,531,142 A * | 9/1970 | Peasley | F16L 47/28 411/908 |
| 3,832,931 A | 9/1974 | Talan | |
| 4,087,896 A * | 5/1978 | Salter | F16B 37/00 81/53.2 |
| 5,070,662 A * | 12/1991 | Niese | E04B 1/6141 52/392 |
| 6,461,092 B2 | 10/2002 | Tseng | |
| 6,679,661 B2 * | 1/2004 | Huang | F16B 13/002 411/395 |
| 6,884,014 B2 * | 4/2005 | Stone | F16B 5/025 411/352 |
| 7,025,552 B2 * | 4/2006 | Grubert | F16B 5/025 411/546 |
| 7,165,924 B1 | 1/2007 | Breslin | |

(Continued)

FOREIGN PATENT DOCUMENTS

WO    WO2004027270    1/2004

*Primary Examiner* — Gary W Estremsky (57) ABSTRACT

A fastening nut device for fastening one substrate to another includes a cylinder, which is circumferentially larger proximate to a first end thereof, thus defining a first section and a second section of the cylinder. External threading, which is reversed, is positioned on the second section and extends from a second end of the cylinder. The cylinder can be inserted into a first hole positioned in a first substrate by counterclockwise rotation. The first section of the cylinder abuts a first face of the first substrate and the second end of the cylinder is accessible from a second face of the first substrate. A channel, which is internally threaded, extends into the cylinder from the second end. A threaded fastener, which is engaged to a second substrate, can be inserted by clockwise rotation into the channel to engage the second substrate to the second face of the first substrate.

18 Claims, 6 Drawing Sheets

(56) References Cited

U.S. PATENT DOCUMENTS

| | | | | |
|---|---|---|---|---|
| 7,465,136 B2* | 12/2008 | Nagayama | ............ | F16B 37/122 411/432 |
| 7,585,237 B2* | 9/2009 | Fukuda | ................. | B62M 9/125 411/383 |
| 7,985,040 B2* | 7/2011 | Cao | ....................... | F16B 35/041 411/397 |
| 8,434,981 B2* | 5/2013 | Bosterling | ................ | F16B 3/06 238/315 |
| 9,028,185 B2* | 5/2015 | Eggers | ................. | F16B 37/122 411/178 |
| 10,145,405 B1* | 12/2018 | Strom | .................. | F16B 37/127 |

* cited by examiner

FASTENING NUT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fastening devices and more particularly pertains to a new fastening device for fastening one substrate to another.

(2) Description of Related Art Including Information Disclosed Under 37 CFR 1.97 and 1.98

The prior art relates to fastening devices. Prior art fastening devices, which may comprise locking nuts having both internal and external threading, do not teach the base features of the present invention.

BRIEF SUMMARY OF THE INVENTION

An embodiment of the disclosure meets the needs presented above by generally comprising a cylinder, which has a first end and a second end. The cylinder is circumferentially larger proximate to the first end, thus defining a first section and a second section of the cylinder. External threading is positioned on the second section and extends from the second end toward the first section. The external threading is reversed so that the cylinder is configured for counterclockwise rotational insertion into a first hole positioned in a first substrate. The first section of the cylinder abuts a first face of the first substrate and the second end of the cylinder is accessible from a second face of the first substrate. A channel, which is internally threaded, extends into the cylinder from the second end. The channel is configured for clockwise rotational insertion of a threaded fastener, which is engaged to a second substrate, to engage the second substrate to the second face of the first substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new fastening device embodying the principles and concepts of an embodiment of the disclosure and generally designated by the reference numeral 10 will be described.

Figure 1:
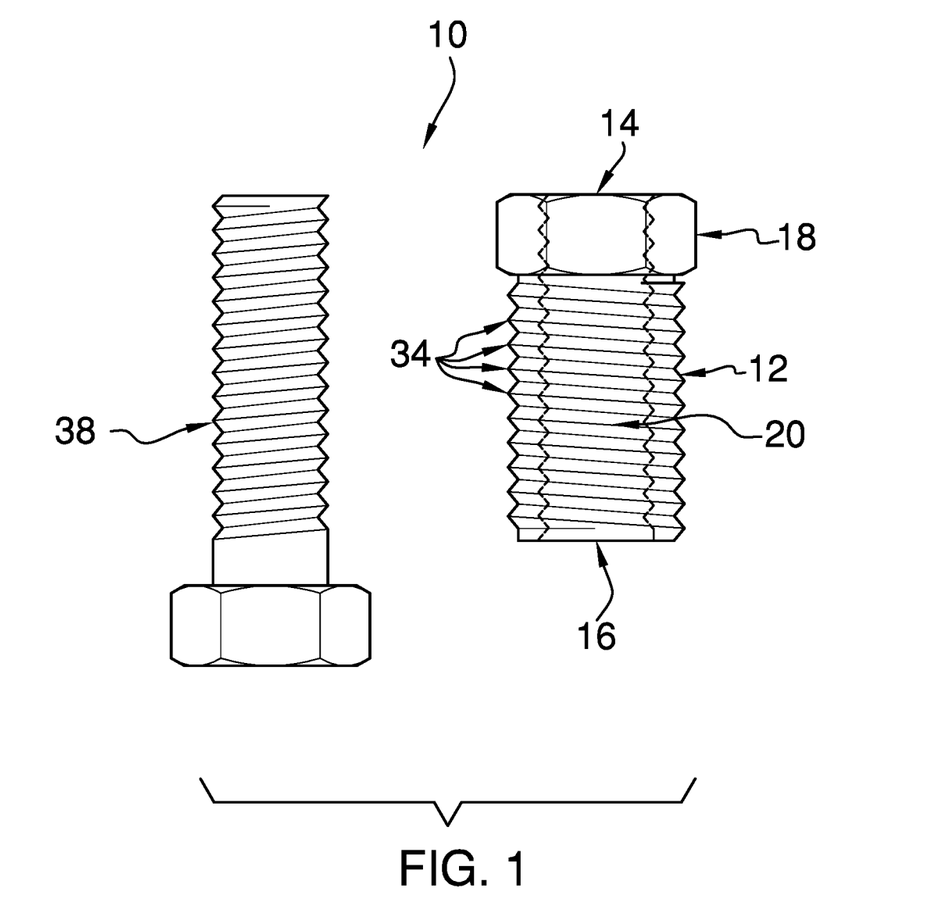
FIG. 1 is a side view of a fastening nut device according to an embodiment of the disclosure.
Figure 2:
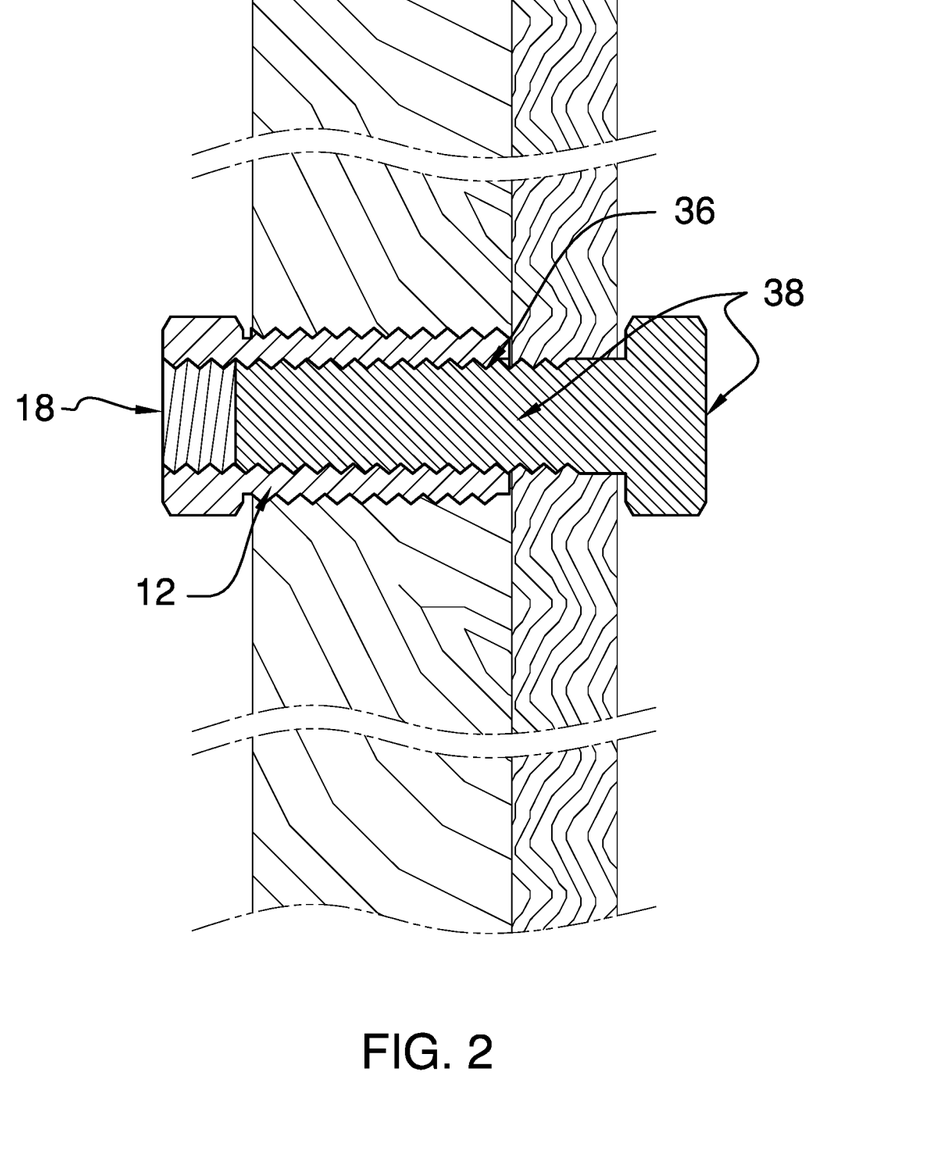
FIG. 2 is a cross-sectional in-use view of an embodiment of the disclosure.
Figure 3:
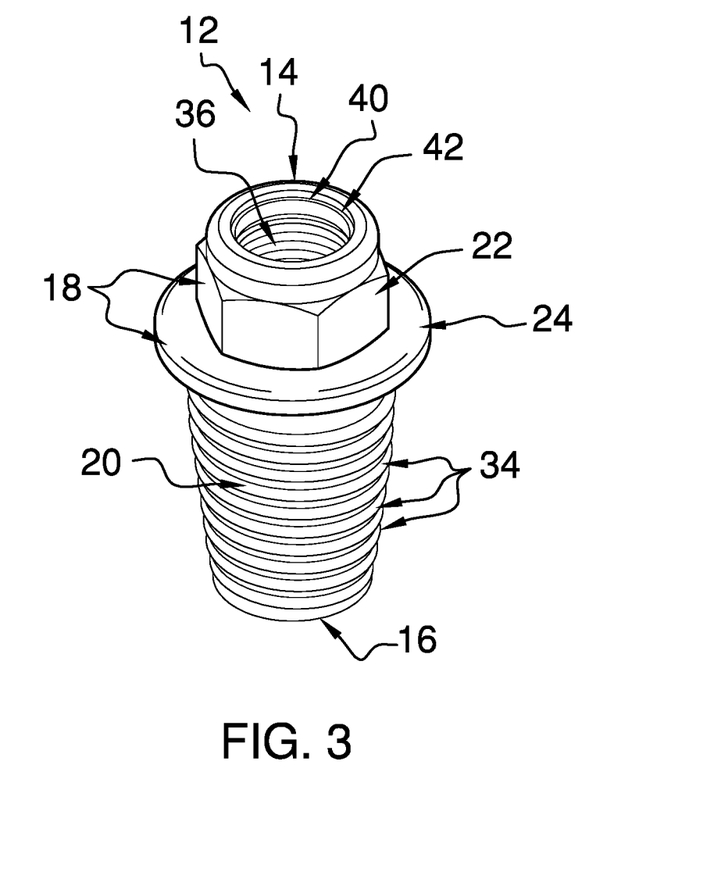
FIG. 3 is an isometric perspective view of an embodiment of the disclosure.
Figure 4:
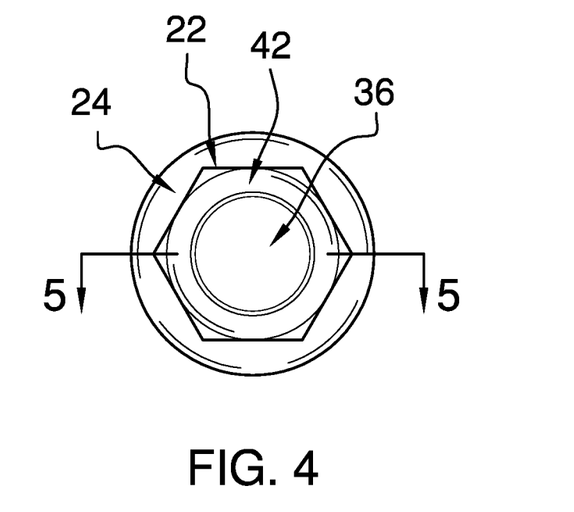
FIG. 4 is a top view of an embodiment of the disclosure.
Figure 7:
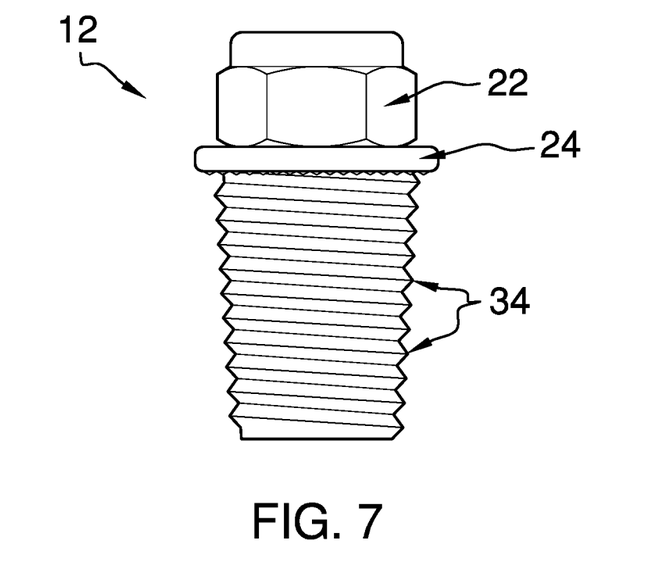
FIG. 7 is a side view of an embodiment of the disclosure.
Figure 8:
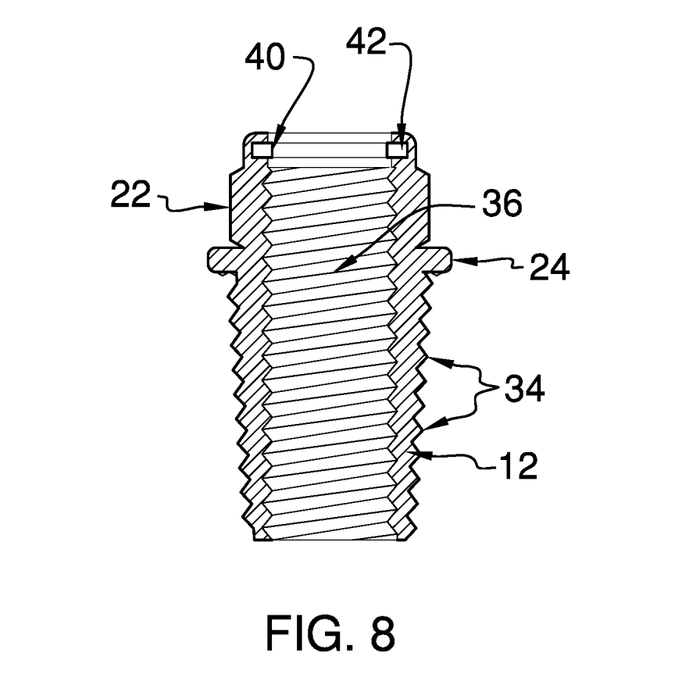
FIG. 8 is a cross-sectional view of an embodiment of the disclosure.
Figure 9:
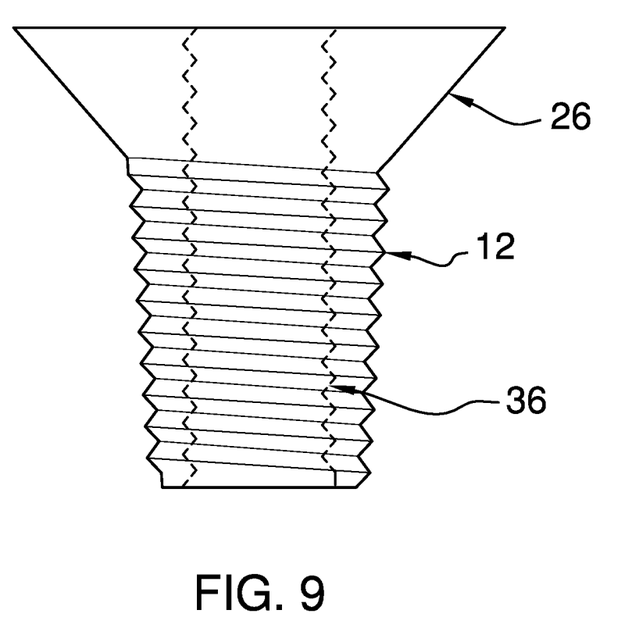
FIG. 9 is a side view of an embodiment of the disclosure.

As best illustrated in FIGS. 1 through 9, the fastening nut device 10 generally comprises a cylinder 12, which has a first end 14 and a second end 16. The cylinder 12 is circumferentially larger proximate to the first end 14, thus defining a first section 18 and a second section 20 of the cylinder 12. The first section 18 is formed so that it defines at least one of a nut 22, a disc 24, and a screwhead 26. For example, the first section 18 may form a nut 22, as shown in FIG. 1, both a nut 22 and a disc 24, as shown in FIG. 3, a screwhead 26, as shown in FIG. 9, or both a screwhead 26 and a disc 24 (not shown).

The disc 24 may have a plurality of serrations 28 extending into a lower face 30 thereof to define a plurality of teeth 32, the function of which will become apparent. The first section 18 can be formed to provide screwheads 26 that are complementary to any of a variety of driver types, such as, but not limited to, flathead screwdrivers, Philips screwdrivers, Allen wrenches, and the like.

External threading 34 is positioned on the second section 20 and extends from the second end 16 toward the first section 18. The external threading 34 may extend to the first section 18, as shown in FIG. 1. The external threading 34 is reversed so that the cylinder 12 is configured for counterclockwise rotational insertion into a first hole positioned in a first substrate, as shown in FIG. 2. The first section 18 of the cylinder 12 abuts a first face of the first substrate and the second end 16 of the cylinder 12 is accessible from a second face of the first substrate.

In a first example where the first section 18 is formed as a screwhead 26 that is tapered, as shown in FIG. 9, the hole in the first substrate may be countersunk so that the screwhead 26 is flush to the first face of the first substrate.

Figure 5:
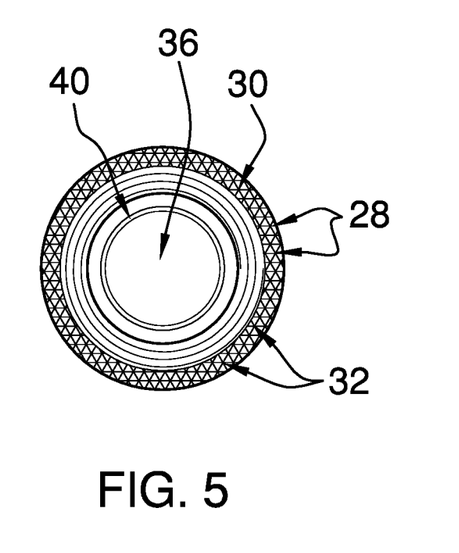
FIG. 5 is a bottom view of an embodiment of the disclosure.
Figure 6:
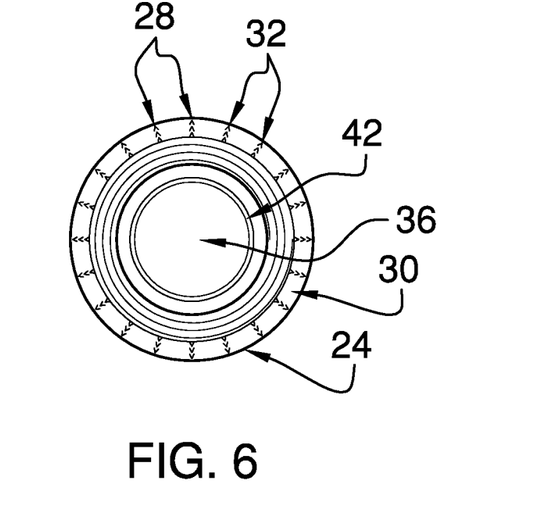
FIG. 6 is a bottom view of an embodiment of the disclosure.

In a second example where the first section 18 is formed to include a disc 24 bearing a plurality of teeth 32, as shown in FIGS. 5-7, the teeth 32 engage the first substrate to enhance engagement of the cylinder 12 to the first substrate.

The second section 20 of the cylinder 12 may taper from the first section 18 to the second end 16 of the cylinder 12, as shown in FIG. 8. The external threading 34 may be configured to drill the first substrate so that the cylinder 12 is self-tapping.

A channel 36, which is internally threaded, extends into the cylinder 12 from the second end 16. The channel 36 may extend to the first end 14 of the cylinder 12. The channel 36 is configured for clockwise rotational insertion of a threaded fastener 38, such as a bolt, as shown in FIGS. 1 and 2. Insertion of the threaded fastener 38, which is engaged to a second substrate, into the channel 36, engages the second substrate to the second face of the first substrate.

While the device 10 is structurally similar to screw-in type anchors used with screws for attaching articles to a substrate, it is differentiated by the external threading 34, which is reversed relative to that of screw-in type anchors. Additionally, the channel 36 is internally threaded to accept the threaded fastener 38 from the second end 16 of the cylinder 12, which is opposite to how screw-in type anchors are used. Ultimately, the device 10 facilitates engagement of a second substrate to the second face of a first substrate, whereas a screw-in type anchor would be used to engage a second substrate to a first face of the first substrate.

The device 10 may comprise a locking element 40, which is positioned in the channel 36 and which is engaged to the cylinder 12. The locking element 40 is configured to engage the threaded fastener 38 to deter counterclockwise rotation of the threaded fastener 38, which serves to resist loosening of the threaded fastener 38 due to vibrations and torque. The locking element 40 may be positioned proximate to the first end 14 of the cylinder 12, as shown in FIG. 8. The locking element 40 may comprise a nylon collar 42, which is engaged to the cylinder 12 and which extends circumferentially around the channel 36. The present invention anticipates the locking element 40 comprising other deformable materials, such as steel and the like.

In use, a first hole is created in the first face of the first substrate and the cylinder is threadedly inserted thereinto using counterclockwise rotation. The second substrate having the threaded fastener 38 engaged thereto is positioned proximate to the second face of the first substrate so that the threaded fastener can be threaded into the channel 36. Tightening of the threaded fastener 38 engages the second substrate to the first substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A fastening nut device comprising:
a cylinder having a first end and a second end, the cylinder being circumferentially larger proximate to the first end defining a first section and a second section of the cylinder, wherein the second section tapers from the first section to the second end of the cylinder;
external threading positioned on the second section and extending from the second end toward the first section, the external threading being reversed, wherein the cylinder is configured for counterclockwise rotational insertion into a first hole positioned in a first substrate, such that the first section of the cylinder abuts a first face of the first substrate, and such that the second end of the cylinder is accessible from a second face of the first substrate; and
a channel extending into the cylinder from the second end, the channel being internally threaded, wherein the channel is configured for clockwise rotational insertion of a threaded fastener engaged to a second substrate for engaging the second substrate to the second face of the first substrate.

2. The fastening nut device of claim 1, wherein the external threading is configured for drilling the first substrate, such that the cylinder is self-tapping.

3. The fastening nut device of claim 1, wherein the first section is formed such that the first section defines at least one of a nut, a disc, and a screwhead.

4. The fastening nut device of claim 3, wherein the first section is formed such that the first section defines a nut and a disc.

5. The fastening nut device of claim 4, wherein the disc has a plurality of serrations extending into a lower face thereof defining a plurality of teeth.

6. The fastening nut device of claim 1, wherein the external threading extends to the first section.

7. The fastening nut device of claim 1, wherein the channel extends to the first end of the cylinder.

8. The fastening nut device of claim 1, further including a locking element positioned in the channel and engaged to the cylinder, the locking element being configured for engaging the threaded fastener for deterring counterclockwise rotation of the threaded fastener.

9. The fastening nut device of claim 8, wherein:
the channel extends to the first end of the cylinder; and
the locking element is positioned proximate to the first end of the cylinder.

10. A fastening nut device comprising:
a cylinder having a first end and a second end, the cylinder being circumferentially larger proximate to the first end defining a first section and a second section of the cylinder;

external threading positioned on the second section and extending from the second end toward the first section, the external threading being reversed, wherein the cylinder is configured for counterclockwise rotational insertion into a first hole positioned in a first substrate, such that the first section of the cylinder abuts a first face of the first substrate, and such that the second end of the cylinder is accessible from a second face of the first substrate;

a channel extending into the cylinder from the second end, the channel being internally threaded, wherein the channel is configured for clockwise rotational insertion of a threaded fastener engaged to a second substrate for engaging the second substrate to the second face of the first substrate;

a locking element positioned in the channel and engaged to the cylinder, the locking element being configured for engaging the threaded fastener for deterring counterclockwise rotation of the threaded fastener; and wherein the locking element comprises a nylon collar engaged to the cylinder and extending circumferentially around the channel.

11. A fastening nut device and threaded fastener combination comprising:

a cylinder having a first end and a second end, the cylinder being circumferentially larger proximate to the first end defining a first section and a second section of the cylinder;

external threading positioned on the second section and extending from the second end toward the first section, the external threading being reversed, wherein the cylinder is configured for counterclockwise rotational insertion into a first hole positioned in a first substrate, such that the first section of the cylinder abuts a first face of the first substrate, and such that the second end of the cylinder is accessible from a second face of the first substrate; and a channel extending into the cylinder from the second end, the channel being internally threaded;

a threaded fastener engaged to a second substrate such that the threaded fastener is positioned for clockwise rotational insertion into the second end of the cylinder, wherein the threaded fastener and the cylinder are configured for engaging the second substrate to the first substrate;

wherein the second section tapers from the first section to the second end of the cylinder; and wherein the external threading is configured for drilling the first substrate, such that the cylinder is self-tapping.

12. The fastening nut device and threaded fastener combination of claim 11, wherein the first section is formed such that the first section defines at least one of a nut, a disc, and a screwhead.

13. The fastening nut device and threaded fastener combination of claim 11, wherein the external threading extends to the first section.

14. The fastening nut device and threaded fastener combination of claim 11, wherein the channel extends to the first end of the cylinder.

15. The fastening nut device and threaded fastener combination of claim 11, further including a locking element positioned in the channel and engaged to the cylinder, the locking element being configured for engaging the threaded fastener for deterring counterclockwise rotation of the threaded fastener.

16. The fastening nut device and threaded fastener combination of claim 15, wherein:

the channel extends to the first end of the cylinder; and the locking element is positioned proximate to the first end of the cylinder.

17. A fastening nut device and threaded fastener combination comprising:

a cylinder having a first end and a second end, the cylinder being circumferentially larger proximate to the first end defining a first section and a second section of the cylinder, wherein the first section is formed such that the first section defines at least one of a nut, a disc, and a screwhead;

external threading positioned on the second section and extending from the second end toward the first section, the external threading being reversed, wherein the cylinder is configured for counterclockwise rotational insertion into a first hole positioned in a first substrate, such that the first section of the cylinder abuts a first face of the first substrate, and such that the second end of the cylinder is accessible from a second face of the first substrate; and a channel extending into the cylinder from the second end, the channel being internally threaded;

a threaded fastener engaged to a second substrate such that the threaded fastener is positioned for clockwise rotational insertion into the second end of the cylinder, wherein the threaded fastener and the cylinder are configured for engaging the second substrate to the first substrate;

wherein the first section is formed such that the first section defines a nut and a disc; and wherein the disc has a plurality of serrations extending into a lower face thereof defining a plurality of teeth.

18. A fastening nut device comprising:

a cylinder having a first end and a second end, the cylinder being circumferentially larger proximate to the first end defining a first section and a second section of the cylinder, the second section tapering from the first section to the second end of the cylinder, the first section being formed such that the first section defines at least one of a nut, a disc, and a screwhead, the disc having a plurality of serrations extending into a lower face thereof defining a plurality of teeth;

external threading positioned on the second section and extending from the second end toward the first section, the external threading being reversed, wherein the cylinder is configured for counterclockwise rotational insertion into a first hole positioned in a first substrate, such that the first section of the cylinder abuts a first face of the first substrate, and such that the second end of the cylinder is accessible from a second face of the first substrate, the external threading extending to the first section, the external threading being configured for drilling the first substrate, such that the cylinder is self-tapping;

a channel extending into the cylinder from the second end, the channel being internally threaded, wherein the channel is configured for clockwise rotational insertion of a threaded fastener engaged to a second substrate for engaging the second substrate to the second face of the first substrate, the channel extending to the first end of the cylinder; and a locking element positioned in the channel and engaged to the cylinder, the locking element being configured for engaging the threaded fastener for deterring counterclockwise rotation of the threaded fastener, the locking element being positioned proximate to the first end of the cylinder, the locking element comprising a nylon collar engaged to the cylinder and extending circumferentially around the channel.

\* \* \* \* \*